June 24, 1930. A. O. JOHNSON 1,766,519
MOTOR
Filed July 14, 1927 3 Sheets-Sheet 1

Inventor
August O. Johnson
By Fred Gerlach Atty

June 24, 1930.  A. O. JOHNSON  1,766,519
MOTOR
Filed July 14, 1927  3 Sheets-Sheet 2

Inventor
August O. Johnson

Inventor
August O. Johnson
By Fred Gerlach
Atty

Patented June 24, 1930

1,766,519

UNITED STATES PATENT OFFICE

AUGUST O. JOHNSON, OF CHICAGO, ILLINOIS

MOTOR

Application filed July 14, 1927. Serial No. 205,582.

The invention relates generally to fluid driven motors. More particularly the invention relates to that type of fluid driven motor which comprises a rotor having a plurality of fixed radially extending pistons, and rotary elements adapted to coact with the periphery of the rotor to confine the fluid and having recesses therein for permitting the pistons to pass therethrough during rotation.

One object of the invention is to provide a motor of the aforementioned character having valves for controlling the ingress and egress of fluid to the motor cylinder which are of an improved construction and are more efficient in operation than the valves heretofore used. In general, these valves are of the disc type and are disposed at the sides of the rotary elements and are connected to be driven simultaneously therewith.

Another object of the invention is to provide a fluid driven motor of this character which is of improved construction, consists of a minimum number of parts, and may be manufactured at a comparatively low cost.

Another object of the invention is to provide a unitary structure which embodies a plurality of these motors, the rotors of which are connected to drive a common shaft and are arranged so that their pistons are offset with respect to each other.

Other objects of the invention will be apparent from a consideration of the following detailed description.

The invention consists in the several novel features hereinafter set forth and more particularly defined by the claims at the conclusion hereof.

Figure 1:
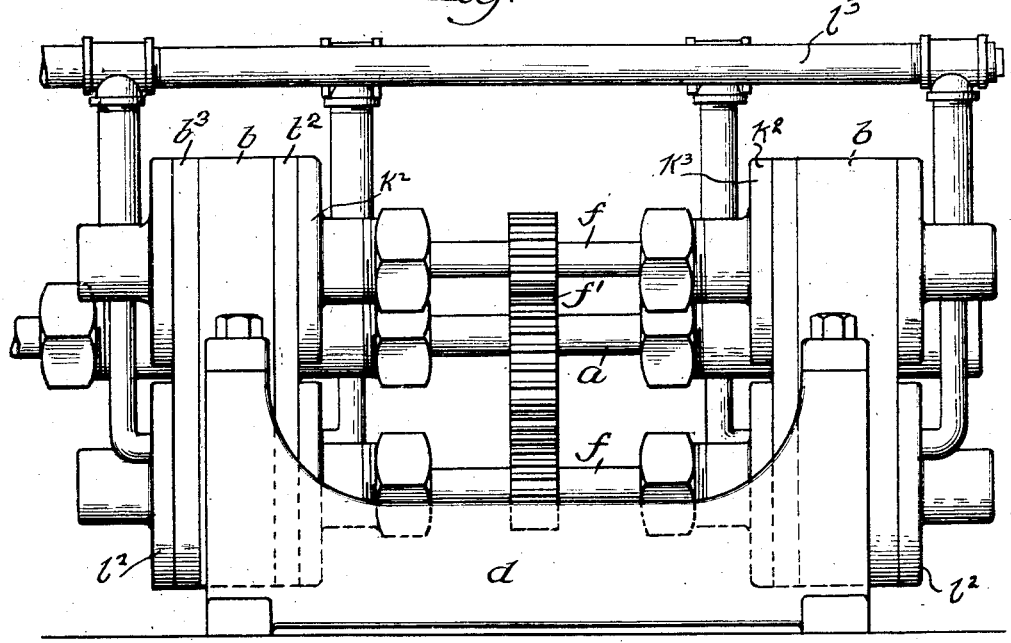
Figure 2:
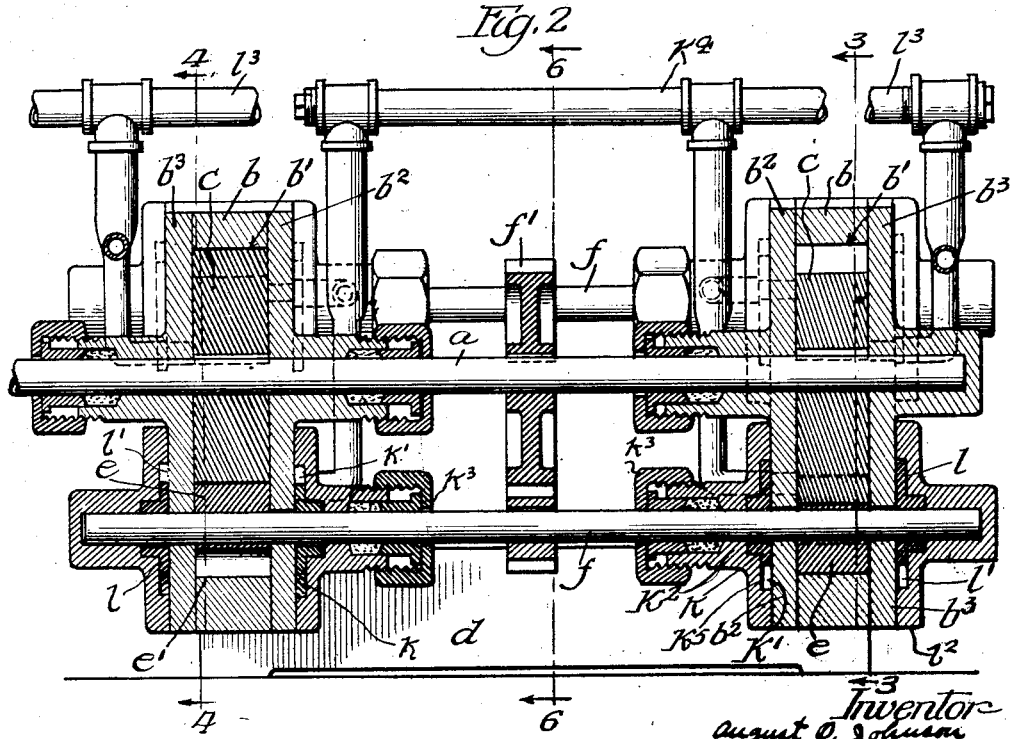
Figure 3:
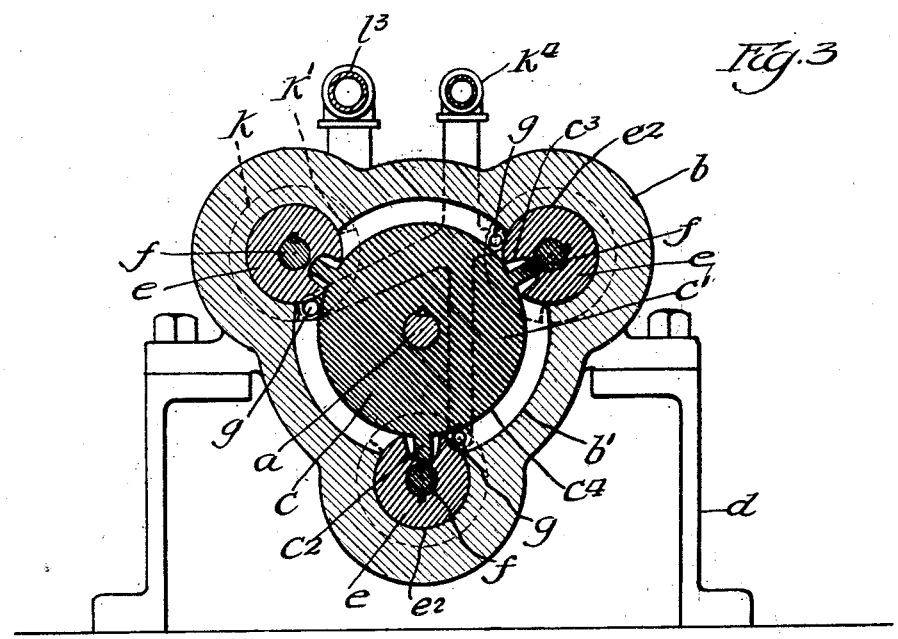
Figure 4:
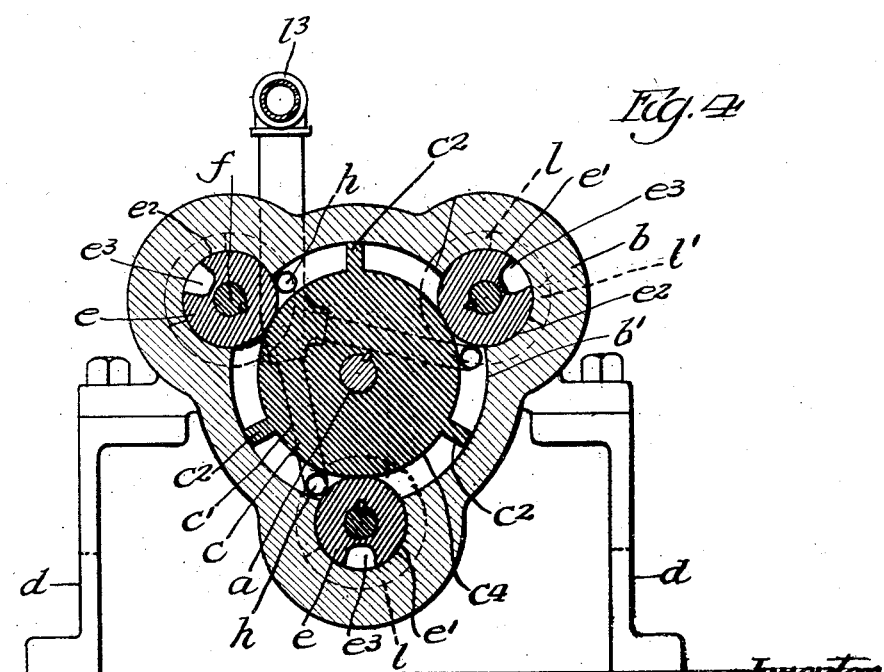
Figure 5:
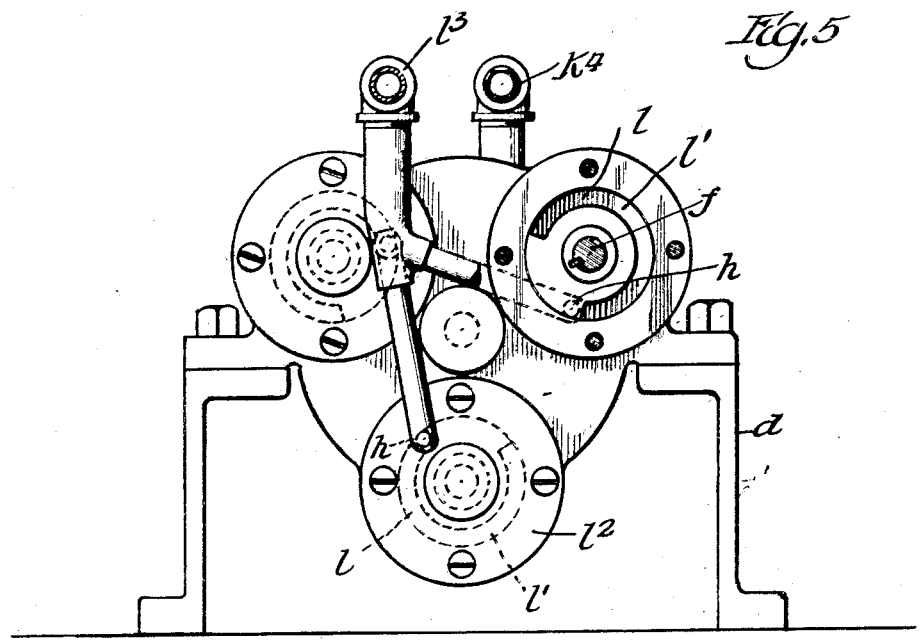
Figure 6:
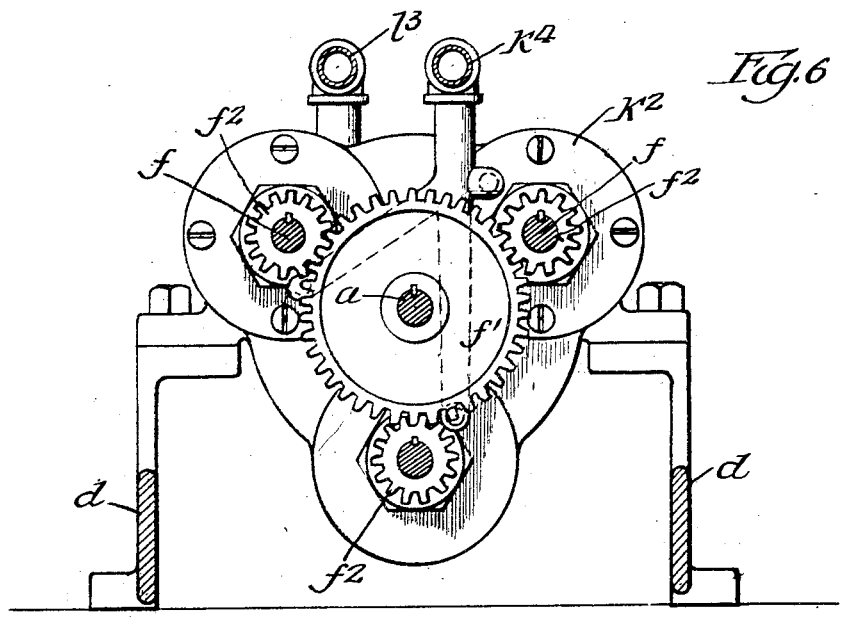

In the drawings: Fig. 1 is a side elevation of a structure embodying the invention. Fig. 2 is a central longitudinal section. Fig. 3 is a section taken on line 3—3 of Fig. 2. Fig. 4 is a section taken on line 4—4 of Fig. 2. Fig. 5 is an end view, one of the caps being removed to illustrate one of the fluid-controlling valves. Fig. 6 is a section taken on line 6—6 of Fig. 2.

The invention is exemplified in a structure comprising a pair of motors of like construction for driving a shaft $a$. Each motor comprises a casing $b$ having a cylinder $b'$ formed therein and a rotor $c$ keyed to the shaft $a$. The sides of each casing $b$ and cylinder $b'$ are closed by inner and outer heads $b^2$ and $b^3$ respectively, between which the body of the rotor $c$ fits. The casings $b$ are mounted on suitable side frames $d$. Each rotor comprises a body $c'$ and a series of radial pistons $c^2$ which project from the periphery $c^4$ of said body into contact with the periphery of the cylinder $b'$. A corresponding series of rotary coacting elements $e$ are rotatably mounted in cylindrical recesses $e'$ formed in each of the casings $b$, and intersect the cylinder $b'$. Each element $e$ has a cylindrical periphery $e^2$ which engages the periphery $c^4$ of the rotor body and a peripheral notch $e^3$ to successively admit the pistons $c^2$ and permit them to pass through the element $e$ during rotation. Each element $e$ is secured to a longitudinal shaft $f$. These shafts are synchronously driven with the rotor body by a gear $f'$ which is fixed to shaft $a$ and pinions $f^2$ which are fixed to the shafts $f$. This gearing is designed so that the periphery $c^4$ of the rotor body and the peripheries of the elements $e$ will travel at the same surface speed, thus avoiding friction between coacting rotary elements. Intake ports $g$ lead through the head $b^2$ into the fluid space between the pistons $c^2$ adjacent the elements $e$ respectively. Exhaust ports $h$ extend through each head $b^3$ into the fluid space between the pistons $c^2$. A rotary disc valve $k$ having an inlet port $k'$ is fixed to each of the shafts $f$, and fits against the outer face of head $b^2$ to control one of the intake ports $g$. A rotary disc valve $l$, having an exhaust port $l'$, is fixed to each of the shafts $f$ to rotate against the outer face of head $b^3$. Each valve $l$ is encased in a cap $l^2$ which is removably secured to the head $b^3$. Each valve $k$ is encased in a cap $k^2$ which is provided with a suitable packing box $k^3$ to prevent leakage of fluid around the shaft $f$. A supply manifold $k^4$ is connected by branches to deliver fluid into the valve spaces of all of the caps $k^2$ from a single source of supply. An exhaust manifold $l^3$ is connected by suitable branches to all of the caps $l^2$, to carry off the fluid from the spaces in which the valves $l$ rotate.

In operation, the fluid under pressure will be constantly supplied to the spaces $k^5$ in which the valves $k$ rotate. When the valves $k$ are open, fluid will pass through the intake ports $g$ into the spaces between elements $e$ and the pistons $c^2$ respectively, and rotate the pistons. After sufficient fluid has been admitted to propel the rotor one-third of a revolution, the valves $k$ will cut off the supply of fluid. While the pistons $c^2$ are operating through the notches $e^3$, the exhaust valves and the intake valves will both be closed. After the pistons have passed the intake ports, the intake and exhaust valves will be opened. This operation is repeated three times during every revolution of the shaft $a$, so that it will receive three power impulses. These impulses will be simultaneously applied to all of the pistons.

The rotors $c$ are arranged so that the pistons of one are offset with respect to the pistons of the other. Thus during operation of the motor, shaft $a$ is continuously subjected to power impulses, and no fly wheel or weighted element is necessary to carry the shaft over dead center points.

The construction is such that the rotor can be driven in either direction by utilizing either of the manifolds as the intake and the other as the exhaust. While the invention has been described as a motor operable by fluid under pressure, it may, without change in construction, be driven and utilized as a compressor of the fluid.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fluid motor of the character described, the combination of a casing having a cylinder formed therein and recesses adjoining the cylinder, a rotor concentrically mounted in the cylinder and provided with a cylindrical periphery and pistons projecting therefrom, coacting rotary elements mounted in the recesses and provided with peripheries engaging the periphery of the rotor, said elements being provided with notches for permitting the pistons to pass therethrough during rotation, the said peripheries of the rotor and elements and the inner periphery of the cylinder forming together pressure compartments for the pistons, means in the casing forming an inlet port at one end of each compartment and an outlet port at the other end, and valves rotatable with said elements, for controlling the ingress and egress of fluid through said inlet and outlet ports.

2. In a fluid motor of the character described, the combination of a casing having a cylinder formed therein and recesses adjoining the cylinder, a rotor concentrically mounted in the cylinder and provided with a cylindrical periphery and piston projecting therefrom, coacting rotary elements mounted in the recesses and provided with peripheries engaging the periphery of the motor, said elements being provided with notches for permitting the pistons to pass therethrough during rotation, the said peripheries of the rotor and elements and the inner periphery of the cylinder forming together pressure compartments for the pistons, means in one side of the casing forming an inlet port at one end of each compartment, means in the other side of the casing forming an outlet port at the other end of each compartment, and a pair of valves rotatable with and disposed at the sides of each element for controlling the ingress and egress of fluid through said inlet and outlet ports.

3. In a fluid motor of the character described, the combination of a casing having a cylinder formed therein and recesses adjoining the cylinder, a rotor concentrically mounted in the cylinder and provided with a cylindrical periphery and piston projecting therefrom, coacting rotary elements mounted in the recesses and provided with peripheries engaging the periphery of the motor, said elements being provided with notches for permitting the pistons to pass therethrough during rotation, the said peripheries of the rotor and elements and the inner periphery of the cylinder forming together pressure compartments for the pistons, means in one side of the casing forming an inlet port at one end of each compartment, means in the other side of the casing forming an outlet port at the other end of each compartment, a pair of valves associated and rotatable with each element, said valves being disposed adjacent the outer faces of the said sides of the casing respectively, and caps removably secured to the casing for housing said valves.

Signed at Chicago, Illinois, this 12th day of July, 1927.

AUGUST O. JOHNSON.